(12) United States Patent
Boehm (10) Patent No.: US 11,185,391 B2
(45) Date of Patent: Nov. 30, 2021

(54) MIXER ASSEMBLY AND DEVICE FOR DISPENSING A DENTAL MATERIAL

(71) Applicant: 3M INNOVATIVE PROPERTIES COMPANY, St. Paul, MN (US)

(72) Inventor: Andreas J. Boehm, Reichling (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/333,766

(22) PCT Filed: Sep. 19, 2017

(86) PCT No.: PCT/US2017/052241
§ 371 (c)(1),
(2) Date: Mar. 15, 2019

(87) PCT Pub. No.: WO2018/057503
PCT Pub. Date: Mar. 29, 2018

(65) Prior Publication Data
US 2019/0209268 A1   Jul. 11, 2019

(30) Foreign Application Priority Data

Sep. 21, 2016 (EP) .................... 16189829

(51) Int. Cl.
*A61C 5/64* (2017.01)
*B01F 5/06* (2006.01)
(Continued)

(52) U.S. Cl.
CPC .............. *A61C 5/64* (2017.02); *A61C 19/005* (2013.01); *B01F 5/0615* (2013.01);
(Continued)

(58) Field of Classification Search
CPC ......... A61C 5/68; A61C 5/64; B01F 13/0023; B01F 15/0226; B01F 15/0237;
(Continued)

(56) References Cited

U.S. PATENT DOCUMENTS

| 358,477 A | 3/1887 | Poppert |
| 385,477 A | 7/1888 | Pitney |

(Continued)

FOREIGN PATENT DOCUMENTS

| CN | 1835873 | 9/2006 |
| DE | 42 29 588 | 3/1994 |

(Continued)

OTHER PUBLICATIONS

*Tetric EvoCeram & Tetric EvoFlow®*, Ivoclar Vivodent, Oct. 29, 2013, 10 pages.
(Continued)

*Primary Examiner* — Ralph A Lewis (57) ABSTRACT

A mixer assembly with a static mixing element arranged within a mixing channel. The mixer assembly has an inlet end, for receiving components of a substance and a dispensing end for dispensing a mixture from the components. The inlet end comprises for each component an inlet and an associated non-return valve. Each of the inlets is connectable for fluid communication with the mixing channel via the associated non-return valve.

8 Claims, 4 Drawing Sheets

(51) Int. Cl.
  *B01F 13/00* (2006.01)
  *B65D 81/32* (2006.01)
  *A61C 19/00* (2006.01)
  *B01F 15/00* (2006.01)
  *B01F 15/02* (2006.01)

(52) U.S. Cl.
  CPC ...... *B01F 13/0023* (2013.01); *B01F 15/0087* (2013.01); *B01F 15/026* (2013.01); *B65D 81/325* (2013.01); *B01F 2215/0034* (2013.01)

(58) Field of Classification Search
  CPC .............. B01F 17/0277; B01F 15/0213; B01F 2215/0026; B01F 15/026; B05C 17/00553; B05C 17/00593
  USPC .............................................. 222/137, 145.5
  See application file for complete search history.

(56) References Cited

U.S. PATENT DOCUMENTS

| | | |
|---|---|---|
| 2,607,341 A | 8/1952 | Brown |
| 2,752,920 A | 7/1956 | Kurkjian |
| 3,494,359 A | 2/1970 | Zackheim |
| 3,603,310 A | 9/1971 | Mottin et al. |
| 3,674,181 A | 7/1972 | Marks |
| 3,735,900 A | 5/1973 | Gores |
| 3,739,947 A | 6/1973 | Baumann |
| 3,965,898 A | 6/1976 | Cloyd |
| 3,967,759 A | 7/1976 | Baldwin et al. |
| 4,082,121 A | 4/1978 | Sturm et al. |
| 4,109,653 A * | 8/1978 | Kozam ................... A61M 5/19 604/191 |
| 4,182,238 A | 1/1980 | Mitchell, Sr. et al. |
| 4,235,235 A | 11/1980 | Bekkering |
| 4,310,102 A | 1/1982 | Walter |
| 4,496,344 A | 1/1985 | Kamstra |
| 4,599,082 A | 7/1986 | Grimard |
| 4,613,326 A | 9/1986 | Szwarc |
| D287,877 S | 1/1987 | Holewinski |
| 4,689,042 A | 8/1987 | Sarnoff et al. |
| 4,693,706 A | 9/1987 | Ennis, III |
| 4,741,623 A * | 5/1988 | Haeuser ............. B01F 15/0237 366/160.2 |
| 4,753,536 A | 6/1988 | Spehar |
| 4,755,169 A | 7/1988 | Sarnoff et al. |
| 4,854,343 A | 8/1989 | Rilett |
| 4,941,752 A | 7/1990 | Yant |
| 4,951,848 A | 8/1990 | Keller |
| 4,966,468 A | 10/1990 | Brüning |
| 4,986,443 A | 1/1991 | Saur et al. |
| 4,993,948 A | 2/1991 | Cameron |
| 5,016,782 A | 5/1991 | Pfanstiel |
| 5,033,650 A | 7/1991 | Colin |
| 5,050,841 A | 9/1991 | Jacobsson |
| 5,178,305 A | 1/1993 | Keller |
| 5,238,003 A | 8/1993 | Baidwan et al. |
| 5,249,709 A | 10/1993 | Duckworth |
| 5,316,186 A | 5/1994 | Prestele |
| 5,324,273 A | 6/1994 | Discko, Jr. |
| 5,392,904 A | 2/1995 | Frick |
| 5,400,926 A | 3/1995 | Keller |
| 5,429,603 A | 7/1995 | Morris |
| 5,437,647 A | 8/1995 | Firth |
| 5,443,183 A * | 8/1995 | Jacobsen ........... B05C 17/00513 222/137 |
| 5,477,987 A * | 12/1995 | Keller ............... B05C 17/00513 222/137 |
| 5,562,273 A | 10/1996 | Wuethrich |
| 5,599,312 A | 2/1997 | Higashikawa |
| 5,716,338 A | 2/1998 | Hjertman et al. |
| 5,722,830 A | 3/1998 | Brandhorst |
| 5,738,655 A | 4/1998 | Vallelunga et al. |
| D401,325 S | 11/1998 | Hjertman |
| 5,938,439 A | 8/1999 | Mertins et al. |
| D419,236 S | 1/2000 | Carlson et al. |
| D421,121 S | 2/2000 | Prasad |
| 6,027,481 A | 2/2000 | Barrelle et al. |
| 6,102,699 A | 8/2000 | Galehr |
| D436,661 S | 1/2001 | Berry |
| 6,213,633 B1 | 4/2001 | Kramer |
| 6,261,094 B1 | 7/2001 | Dragan |
| 6,375,096 B1 * | 4/2002 | Rashidi ............. B01F 15/00344 239/413 |
| 6,375,460 B1 | 4/2002 | Plaumann |
| D472,323 S | 3/2003 | Sand |
| 6,544,233 B1 | 4/2003 | Fukui |
| 6,598,766 B1 | 7/2003 | Brugner |
| 6,685,063 B2 | 2/2004 | Brugner |
| 6,698,622 B2 | 3/2004 | Sawhney et al. |
| 6,740,062 B2 | 5/2004 | Hjertman |
| 6,848,480 B2 | 2/2005 | Brennan |
| 6,884,071 B2 | 4/2005 | Martin |
| 7,018,089 B2 | 3/2006 | Wenz |
| 7,179,085 B2 | 2/2007 | Dorsey |
| 7,198,619 B2 | 4/2007 | Bills |
| D574,954 S | 8/2008 | Smith |
| 7,481,332 B2 * | 1/2009 | Ollmann ........... B05C 17/00516 222/135 |
| 7,562,792 B2 | 7/2009 | Nisbet |
| D618,347 S | 6/2010 | Bradshaw |
| 7,882,983 B2 | 2/2011 | Reidt |
| 7,954,672 B2 | 6/2011 | Keller |
| D645,958 S | 9/2011 | Assmann |
| D657,867 S | 4/2012 | Effenberger |
| D672,873 S | 12/2012 | An |
| 8,328,553 B2 | 12/2012 | Broyles |
| D681,808 S | 5/2013 | Holaschke |
| D690,417 S | 9/2013 | Solomon |
| D690,813 S | 10/2013 | Bizzell |
| D693,940 S | 11/2013 | Walter |
| D696,787 S | 12/2013 | Walter |
| D698,918 S | 2/2014 | Leiner |
| D721,803 S | 1/2015 | Dubach |
| 8,926,567 B2 | 1/2015 | Bahrami |
| 8,978,930 B2 | 3/2015 | Bublewitz |
| D733,908 S | 7/2015 | Eckstein |
| D735,350 S | 7/2015 | Eckstein |
| 9,182,054 B2 | 11/2015 | Haugen |
| D744,643 S | 12/2015 | Eckstein |
| 9,211,168 B2 | 12/2015 | Broyles |
| 9,247,931 B2 | 2/2016 | Blcheva |
| 9,265,594 B2 | 2/2016 | Peuker |
| 9,844,796 B2 | 12/2017 | Hohmann |
| 10,166,514 B2 | 1/2019 | Delmotte |
| 10,279,935 B2 | 5/2019 | Hohmann |
| 10,639,656 B1 * | 5/2020 | Hammerlund ........ B29B 7/7438 |
| 2003/0209561 A1 | 11/2003 | Thomas |
| 2004/0030345 A1 | 2/2004 | Aurin |
| 2004/0122359 A1 | 6/2004 | Wenz |
| 2004/0261888 A1 | 12/2004 | Brennan |
| 2005/0202365 A1 | 9/2005 | Cao |
| 2006/0105292 A1 | 5/2006 | Dorsey |
| 2006/0173411 A1 | 8/2006 | Barere |
| 2007/0015106 A1 | 1/2007 | Bertl |
| 2007/0164047 A1 | 7/2007 | Reidt |
| 2007/0166660 A1 | 7/2007 | Peuker |
| 2008/0203112 A1 | 8/2008 | Peuker |
| 2008/0287880 A1 | 11/2008 | Keller |
| 2009/0020561 A1 | 1/2009 | Keller |
| 2009/0298010 A1 | 12/2009 | Broyles |
| 2010/0240004 A1 | 9/2010 | Zalsman |
| 2011/0056985 A1 | 3/2011 | Bublewitz |
| 2013/0101955 A1 | 4/2013 | Broyles |
| 2013/0116628 A1 | 5/2013 | Kulshrestha |
| 2013/0260335 A1 | 10/2013 | Peuker |
| 2017/0197740 A1 | 7/2017 | Hohmann |

FOREIGN PATENT DOCUMENTS

| | | |
|---|---|---|
| DE | 295 06 800 | 8/1996 |
| DE | 197 20 896 | 12/1997 |
| DE | 298 11 344 | 10/1999 |
| DE | 199 61 485 | 7/2001 |

(56) References Cited

FOREIGN PATENT DOCUMENTS

| | | |
|---|---|---|
| DE | 101 51 104 | 4/2003 |
| DE | 202 16 632 | 3/2004 |
| DE | 102005021076 | 9/2006 |
| EP | 0004743 | 9/1982 |
| EP | 0 112 574 | 7/1984 |
| EP | 0289882 | 11/1988 |
| EP | 0 313 519 | 4/1989 |
| EP | 0 497 739 | 8/1992 |
| EP | 0 966 331 | 12/1999 |
| EP | 1063172 | 12/2000 |
| FR | 2 626 248 | 7/1989 |
| FR | 2 898 112 | 9/2007 |
| JP | 59-134111 | 8/1984 |
| JP | 6162855 | 4/1986 |
| JP | 64058674 | 3/1989 |
| JP | 1-91705 | 6/1989 |
| JP | 9301301 | 11/1997 |
| JP | 10119298 | 5/1998 |
| JP | 2002-253941 | 9/2002 |
| JP | 2005029243 | 2/2005 |
| JP | 6345923 | 6/2018 |
| SU | 705266 | 12/1979 |
| SU | 1549571 | 3/1990 |
| WO | WO 90/05096 | 5/1990 |
| WO | WO 93/22200 | 11/1993 |
| WO | WO 95/28337 | 10/1995 |
| WO | WO 05/016783 | 2/2005 |
| WO | WO 06/132932 | 12/2006 |
| WO | WO 2007/104037 | 9/2007 |
| WO | WO 2009-077881 | 6/2009 |
| WO | WO 2010/123800 | 10/2010 |
| WO | WO 2016-205181 | 12/2016 |

OTHER PUBLICATIONS

*Tetric EvoCeram® Bulk Fill, Nano-Hybrid Composite with Ivocerin*, Ivoclar Vivodent ©, 2013, 6 pages.

International Search report for PCT International Application No. PCT/US2017/052241 dated Oct. 11, 2017, 5 pages.

\* cited by examiner

MIXER ASSEMBLY AND DEVICE FOR DISPENSING A DENTAL MATERIAL

FIELD OF THE INVENTION

The invention relates to a mixer assembly, and in particular to a mixer assembly having non-return valves downstream associated inlets for components to be mixed within the mixer assembly.

BACKGROUND ART

Dental materials are often prepared from two or more components that are mixed together just before use. Often the individual components are obtained as portions from larger packages, for example from tubes, bags or cartridges. There are packages on the market that allow manual or automatic dispensing of two or more components at desired amounts and at an appropriate ratio for mixing. Furthermore there are packages that allow dispensation of portions of readily mixed materials from individually stored components.

Often double-barrel syringes are used for storing and mixing two-component dental materials. Such double-barrel syringes typically have two side by side barrels from which the components of the dental material can be extruded by pushing pistons into the barrels. There are double-barrel syringes which store an amount of dental material that is sufficient for multiple dental treatments. Some of these syringes are configured so that a static mixer can be attached for mixing the two components as there are extruded from the syringe. Typically, the static mixer remains attached to the syringe after use, and thus serves as a closure for the remaining dental material that is stored therein. For a new dental treatment that mixer is replaced by a fresh static mixer of the same type.

International patent application no. PCT/US2016/037342 discloses a dispensing device for dental materials. The device has a static mixer and contains a dental material. The device has a cartridge with two chambers for holding the dental material in the form of two separate components. The device further has a plunger for displacing the dental material toward the mixing elements.

Although existing syringes provide certain advantages there is still a need to provide a system which is easy to use and which provides for an appropriate mixing quality of dental materials.

SUMMARY OF THE INVENTION

The invention relates to a mixer assembly which comprises a housing that forms a mixing channel. The mixer assembly further comprises a static mixing element that is arranged within the mixing channel.

The mixer assembly has an inlet end, for receiving at least two components of a substance, and a dispensing end for dispensing a mixture from the components.

Such a mixer assembly may be used, for example, for mixing two or more components that are at least temporarily continuously supplied to the inlet end. The mixer assembly is preferably configured to cause the components to mix as they flow from the inlet end toward the dispensing end. In particular, typically the static mixing element causes the components to mix as they flow through the mixing channel in which the static mixing element is arranged.

The inlet end comprises for each component an inlet and an associated non-return valve. Each of the inlets is connectable for fluid communication with the mixing channel via the associated non-return valve.

The invention is advantageous in that it helps preventing undesired cross-contamination between the components to be mixed, outside the mixer assembly. This is achieved by hindering components that have been provided into the mixing assembly from flowing back to the inlet. Further, the invention is advantageous in that it provides a mixer assembly which is exchangeable on a cartridge storing the components to be mixed and which minimizes the risk of cross-contamination.

In one embodiment each of the non-return valves preferably permits a flow of the respective component in a direction from the inlet toward the mixing channel. Further, each of the non-return valves preferably blocks a flow of the respective component in a direction from the inlet toward the mixing channel. Accordingly, each non-return valve typically permits a flow of the components in a direction from the inlets toward the outlet end but blocks a flow in the opposite direction. Further, with respect to a direction of flow of the components the non-return valves are preferably located downstream the inlets.

In an embodiment the mixer assembly further comprises for each component a passageway that at a first end forms the respective inlet and at a second end forms an orifice into the mixing channel. Thus, each passageway preferably forms a channel between the respective inlet and the respective orifice and the non-return valve only permits a one-way flow of the respective component in a direction from the inlet toward the orifice.

In a further embodiment the non-return valve is arranged between the inlet and the orifice. The non-return valves are thus arranged within the mixer assembly, so that the mixer assembly, for example after use, can be replaced by a new mixer assembly including the non-return valves. This is advantageous in that the non-return valves prohibit any portion of one or more components which have reached the mixing channel to flow back to the inlets. Therefore, the inlets are kept free from any component, intermingled components or a mixture of the components which previously have reached the mixing chamber. A larger amount of the components stored in a cartridge used in combination with the mixer assembly therefore can be prevented from cross-contamination of the components with each other.

In an embodiment each passageway has an inlet-side duct between the inlet and the non-return valve and a mixer-side duct between the non-return valve and the orifice. The inlet-side duct and the mixer-side duct further constitute portions of the passageway.

In a further embodiment each non-return valve comprises a resilient flap. The flap preferably forms a wall portion of the inlet-side duct and the mixer-side duct. Accordingly, pressure built up in the component flowing past the flap exerts a force on the flap which causes the flap to deflect and thus to open the passageway. Preferably, the passageway has a spacer for stopping the flap from a deflection beyond a predetermined position. Thus, the flap is prevented from deflecting toward an extreme position in which the passageway is reclosed. The passageway is preferably generally U-shaped with the inlet-side duct and the outlet side duct forming the legs of the U. The person skilled in the art will recognize alternative configurations for a non-return valve.

In an embodiment the mixing element is formed in one monolithic piece and comprises a plurality of mixing paddles and at least two flaps. The mixing paddles are preferably arranged consecutively in a row. The mixing element preferably further comprises the inlets. Preferably, the mixing element comprises a closure plate from a first side of which the row of mixing paddles extend. Each inlet preferably forms an inlet channel which extends through the closure plate. Preferably each inlet further comprises a connector socket through which the inlet channel continues, and which protrudes from a second side of the closure plate opposite of the first side. The connector socket may have an outward cylindrical shape. This connector socket may be received within associated outlets of the cartridge. The mixing element preferably has a first and a second plug protruding from the first side of the closure plate. The first and a second plug may have a general half-moon cross-section.

In one embodiment the housing adjacent the inlet end comprises at least two blind-holes. Preferably, in each blind-hole one of the flaps extends. The blind-holes preferably form part of a recess arranged at the inlet end of the mixer assembly. The closure plate of the mixing element preferably closes the recess. The recess is dimensioned such that a space is provided between an end of the mixing channel and the closure plate. Therefore, a component flowing through the respective inlet (and further through the non-return valve) in that space is enabled to flow into the mixing channel. The mixing element and the recess are preferably shaped such that the space between the mixing channel and the closure plate defines the orifices for each component.

In one embodiment each passageway is formed in that the flap divides the space defined by the blind-hole. In particular the blind-hole preferably extends along an insertion axis and may have a stepped inward end face. The stepped end face may have a first partial end face and a second partial end face and a lateral sealing face between the first and second partial end face. The lateral sealing face may be generally parallel to the insertion axis. The lateral sealing face may be planar. Preferably the flap abuts the lateral sealing face of the step. The flap is preferably movable in a direction away from the lateral sealing surface. Further, in a first position, in which the flap abuts the lateral sealing surface, the inlet-side and mixer-side duct are disconnected from fluid communication with each other, and in a second position, in which the flap bends or deflects away from the lateral sealing surface, the inlet-side duct and the mixer-side duct are connected for fluid communication with each other.

In one embodiment the housing at the inlet end forms an annular skirt surrounding the inlets. The inlets are preferably offset from an end of the skirt in a direction inward a space that is defined by the skirt. The skirt may be configured to receive an end on a cartridge storing the two components. Such a cartridge may have a respective outlet for each component.

In a further aspect the invention relates to a device for dispensing a dental material. The device may comprise a cartridge having at least two chambers for holding two components. The device may further comprise the mixer assembly according to the invention. The mixer assembly may be detachably attached to the cartridge. In particular, the mixing assembly may be attached to the cartridge so as to connect the inlets of the mixer assembly with the outlets of the cartridge. The cartridge may have a valve for selectively opening and closing the outlets of the cartridge. Such a valve may be a rotary slide valve having a rotatable valve member. The rotatable valve member may be engageable with the mixer assembly so that the valve can be opened and closed by rotating the mixer assembly relative to the cartridge. The device may have a piston disposed in each chamber. The pistons may be used for urging the component toward the mixer assembly for mixing. The pistons may be connected or connectable to respective plungers. The plungers may be connected to a common thrust plate or finger-plate.

The cartridge may comprise components of the dental material, in particular of a hardenable dental material. The dental material may be configured to harden in consequence of mixing the individual components.

DETAILED DESCRIPTION OF THE INVENTION

Figure 1:
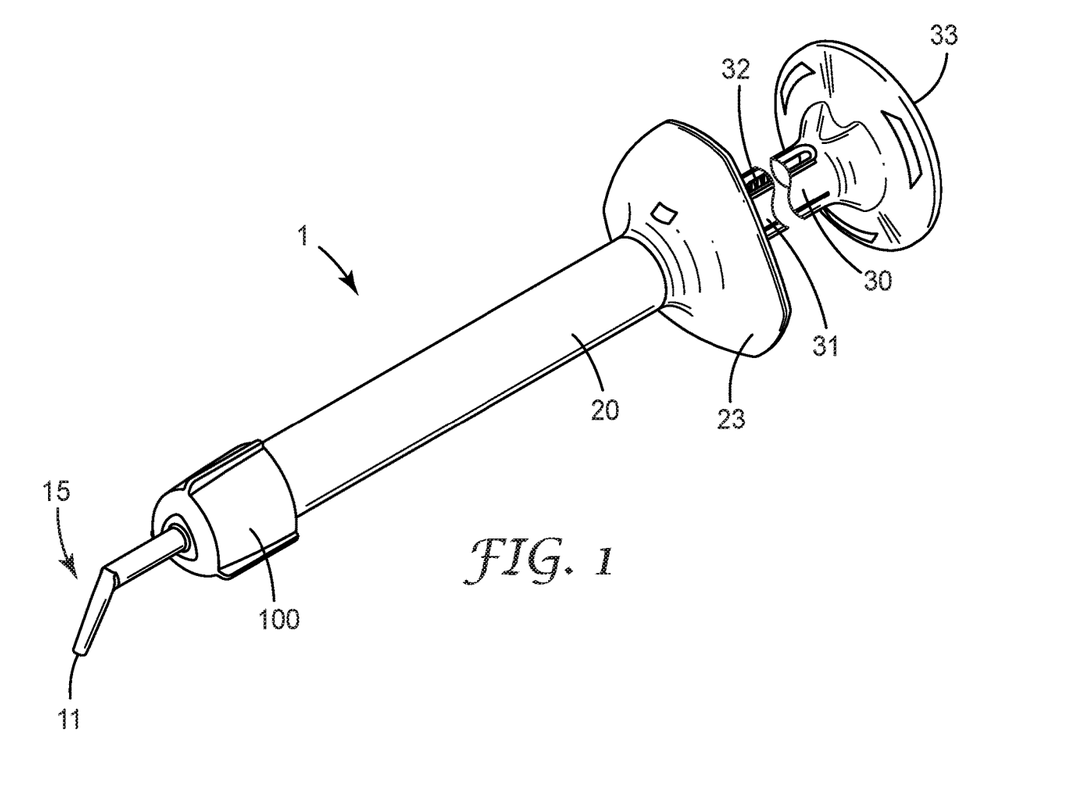
FIG. 1 is a perspective view of a device for dispensing a dental material according to an embodiment of the invention.

FIG. 1 shows a device 1 for dispensing a dental material. The device 1 has a mixer assembly 100, a cartridge 20 and a plunger 30. The cartridge 20 forms two chambers (not visible in this view) for separately storing the dental material in the form of two components. The plunger 30 has two plunger rods 31, 32 for displacing the two components toward the mixer assembly 100. The mixer assembly 100 forms a dispensing opening 11 at a dispensing end 104 of the mixer assembly 100. The device 1 is operable by hand for dispensing dental material. Therefore the device 1 has a finger plate 23 arranged at the cartridge 20 and a pressure plate 33 forming a rear end of the plunger 30. The finger plate 23 in the example is arranged at a rear end of the cartridge 20. It is noted that the present invention is not limited to a hand operated device. Rather, the mixer assembly 100 as described may be likewise used with an appropriate cartridge that is operated in a dispensing gun or in a motor driven dispensing apparatus.

The mixer assembly 100 is received on a front end of the cartridge 20. The mixer assembly 100 and the cartridge 20 are rotatable relative to each other. In particular, the mixer assembly 100 and the cartridge 20 in combination form a rotary valve for selectively opening or closing the chambers of the cartridge 20. Accordingly, the mixer assembly 100 and the cartridge 20 can be rotated relative to each other between a closed position, in which the chambers are closed, and an open position, in which the chambers are in fluid communication with the mixer assembly 100.

In the open position, moving the plunger 30 forward (in a direction toward the mixer assembly 100) causes the individual components of the dental material to flow through the mixer assembly 100. The mixer assembly 100 has a static mixing element (not visible in this view) which causes the components of the dental material to mix as they flow through the mixer assembly 100. Thus, the dental material is dispensed from the dispensing opening 11 in the form of a mixture from the two components.

Figure 2:
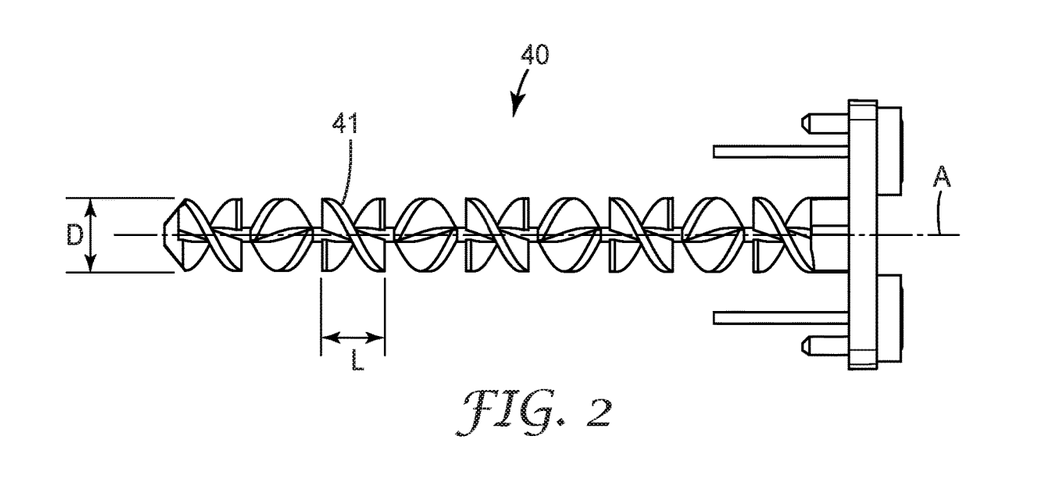
FIG. 2 is a side view of a mixing element and used with an embodiment of the present invention.

FIG. 2 shows the static mixing element 40 which is arranged within the mixer assembly 100 illustrated in FIG. 1. The static mixing element 40 has a series of mixing paddles 41 arranged along a longitudinal axis A. Each mixing paddle 41 is based on a helical shape or a helicoid. The structure of such a helical mixing paddle can be basically imagined as a planar sheet of material which, held at opposite ends, is twisted or wound by 180 degrees, although other methods (for example injection molding) are typically used to manufacture such a structure. The overall outer shape of such a mixing paddle 41 is based on a cylindrical helix. The mixing paddles typically cause the components to be mixed by dividing and re-merging of a strand of material formed of the two components and flowing through the mixing assembly 100. The mixing paddles 41 are typically right or left handed, meaning differ in the winding direction of the helix on which the mixing paddle 41 is based. The right and left handed mixing paddles 41 are typically consecutively arranged in an alternate order along the longitudinal axis A.

The mixing paddles 41 in the example have an outer diameter D of between 1.5 mm and 1.6 mm. Further, each mixing paddle 41 has a length L of between 0.6 mm and 1.2 mm, preferably 0.78 mm. The diameter D as well as the Length L is preferably the same for all mixing paddles 41 of the static mixing element 40.

Figure 3:
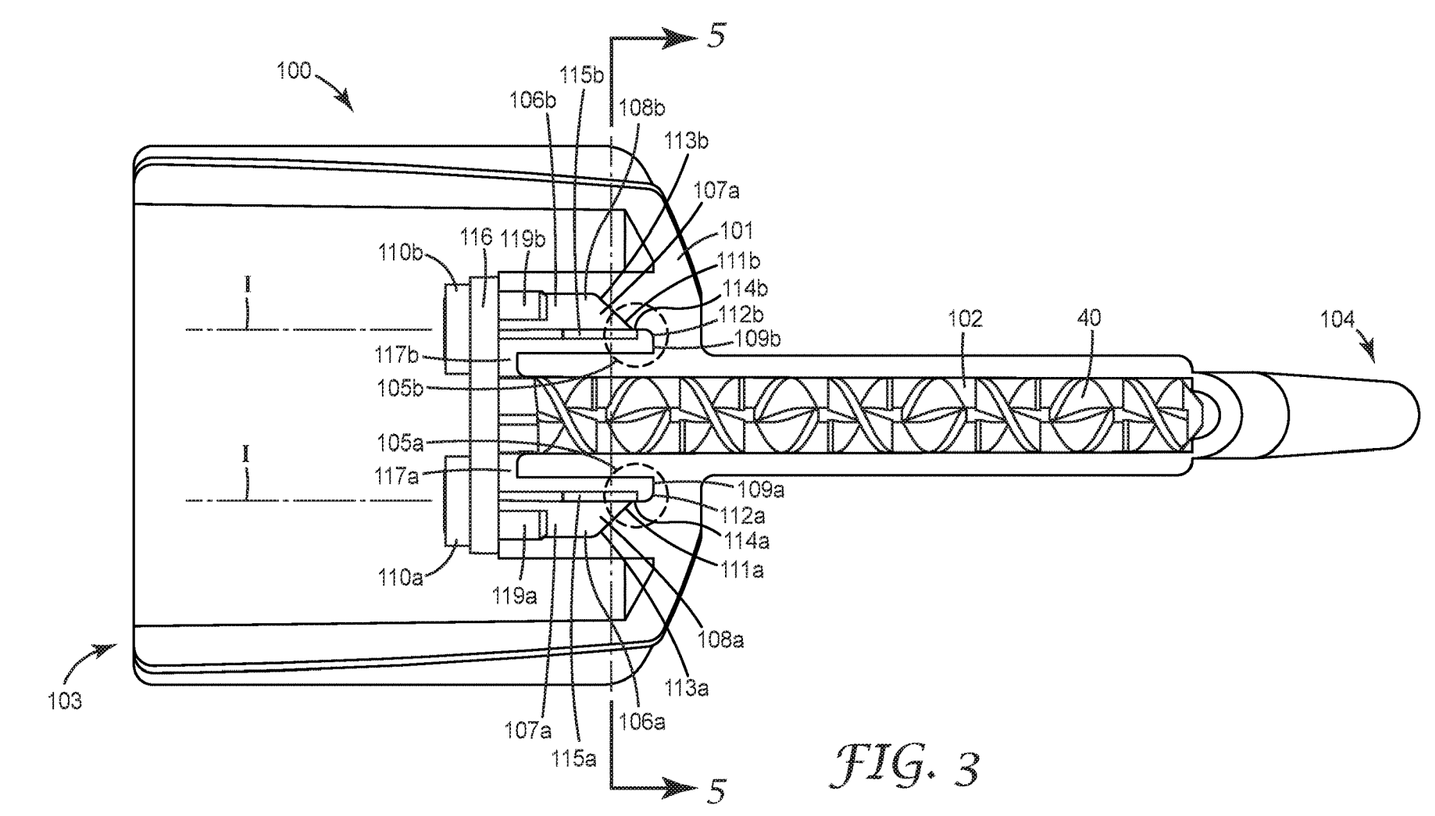
FIG. 3 is a cross-sectional view of a mixing assembly according to an embodiment of the invention at a first stage of operation.

FIG. 3 shows the mixer assembly 100 in more detail. The mixer assembly 100 has, a housing 101 that forms a mixing channel 102. The portion of the housing 101 that forms the mixing channel is a hollow-cylindrical tube. The static mixing element 40 is arranged within the mixing channel 102. In particular, the mixing paddles 41 of the static mixing element (which are formed by a front portion of the static mixing element 40) are arranged within the mixing channel 102.

The mixer assembly 100 has an inlet end 103, for receiving two components, for example from the cartridge shown in FIG. 1. The mixer assembly 100 further has a dispensing end 104 for dispensing a mixture that is mixed from the components. The inlet end 103 comprises a first inlet 110a and a second inlet 110b. The inlet end 103 further comprises a first non-return valve 105a which is associated to the first inlet 110a and a second non-return valve 105b which is associated to the second inlet 110b. The first and second inlet 110a, 110b are formed by a rear portion of the static mixing element 40. The rear portion of the static mixing element 40 is positioned outside the mixing channel 102. In particular, the housing 101 at the inlet end 103 comprises a recess 106. A closure plate 116 of the static mixing element 40 is arranged at the housing 101 such that it seals the recess 106. For positioning and retaining the static mixing element 40 a first and a second plug 119a, 119b are provided at the closure plate 116. The first and second plug 119a, 119b protrude from the closure plate in the same direction as the mixing paddles 41 and are received within the recess 106 by a friction fit. The first and second inlet 110a, 110b are in fluid communication with the (otherwise sealed) recess 106. Further, the recess 106 (or at least part of the recess 106) is in fluid communication with the mixing channel 102 (in the illustrated situation in which the closure plate 116 seals with the housing 101). The mixing element 40 further has a first and a second resilient flap 115a, 115b which each protrude from the closure plate 116 into the recess 106. The recess 106 forms a first and a second blind-hole 106a, 106b into which the first and second flap 115a, 115b, respectively, extend. The first blind-hole 106a in combination with the associated first flap 115a forms a first passageway 107a, and the second blind-hole 106b in combination with the associated second flap 115b forms a second passageway 107b. Each of the first and second passageway 107a, 107b has a first and second inlet-side duct 108a, 108b, respectively, and a mixer-side duct 109a, 109b, respectively. Each of the first and second inlet-side duct 108a, 108b are in fluid communication with the first and second inlet 110a, 110b, respectively. The first and second mixer-side duct 109a, 109b are in fluid communication with a first and a second orifice 117a, 117b, respectively, into the mixing channel 102. In the situation shown in FIG. 3 the first inlet-side duct 108a and the first mixer-side duct 109a are disconnected from fluid communication with each other by the first non-return valve 105a. Further, the second inlet-side duct 108b and the second mixer-side duct 109b are disconnected from fluid communication with each other by the second non-return valve 105b.

The first and second non-return valve 105a, 105b are each formed by the housing 101 in combination with the first and second flap 115a, 115b. In particular, wall portions of the housing 101 which form the first blind-hole 106a form a first open gate at the transition between the first inlet-side duct 108a and the first mixer-side duct 109a, and the first open gate is openably closed by the first flap 115a. Correspondingly, wall portions of the housing 101 which form the second blind-hole 106b form a second open gate at the transition between the second inlet-side duct 108b and the second mixer-side duct 109b, and the second open gate is openably closed by the second flap 115b.

Each of the first and second blind-hole 106a, 106b extends along an insertion axis I. Each of the first and second blind-hole 106a, 106b forms a first and second stepped inward end face 111a, 111b, respectively. In the example, the first end face 111a has a first partial end face 112a, a second partial end face 113a and a lateral sealing face 114a. The first flap 115a, in a first position, abuts the lateral sealing face 111a. Further, the second end face 111b has a first partial end face 112b, a second partial end face 113b and a lateral sealing face 114b. The second flap 115b, in a first position, abuts the lateral sealing face 111b. In the first position the lateral sealing surfaces 114a, 114b prevent a movement of the first and second flap 115a, 115b, respectively, in a direction of a flow of a component from the first and second mixer-side duct 109a, 109b toward the first and second inlet-side duct 108a, 108b. Accordingly, from in the first position a flow of a component from the first mixer-side duct 109a toward the first inlet-side duct 108a and a flow of the second mixer-side duct 109b toward the second inlet-side duct 108b are prohibited. In the illustrated situation the first and second flap 115a, 115b may or may not be under a pre-tension for a deflection toward the lateral sealing faces 114a, 114b. For example, the first and second flap 115a, 115b may be injection molded in the position as shown so that the first and second flap 115a, 115b are not under any (at least a significant) pretension, or may be injection molded in a bent shape before the assembly of the mixing element 40 and the housing 101 so that the first and second flap 115a, 115b urge toward the lateral sealing faces 114a, 114b by natural reset force provided by the material and structure of the first and second flap 115a, 115b.

In the first position the lateral sealing surfaces 114a, 114b stop any movement of the first and second flap 115a, 115b in a direction of a flow of a component from the first and second mixer-side duct 109a, 109b toward the first and second inlet-side duct 108a, 108b but allow a movement of the first and second flap 115a, 115b, respectively, in a direction of a flow of a component from the first and second inlet-side duct 108a, 108b toward the first and second mixer-side duct 109a, 109b. Accordingly, from the first position the first flap 115a can bend away from the first lateral sealing surface 114a so as to open the first gate and thereby enable a flow of a component from the first inlet-side duct 108a toward the first mixer-side duct 109a. Further, from the first position the second flap 115b can bend away from the second lateral sealing surface 114b so as to open the second gate so as to enable a flow of a component from the second inlet-side duct 108b toward the second mixer-side duct 109b.

Figure 4:
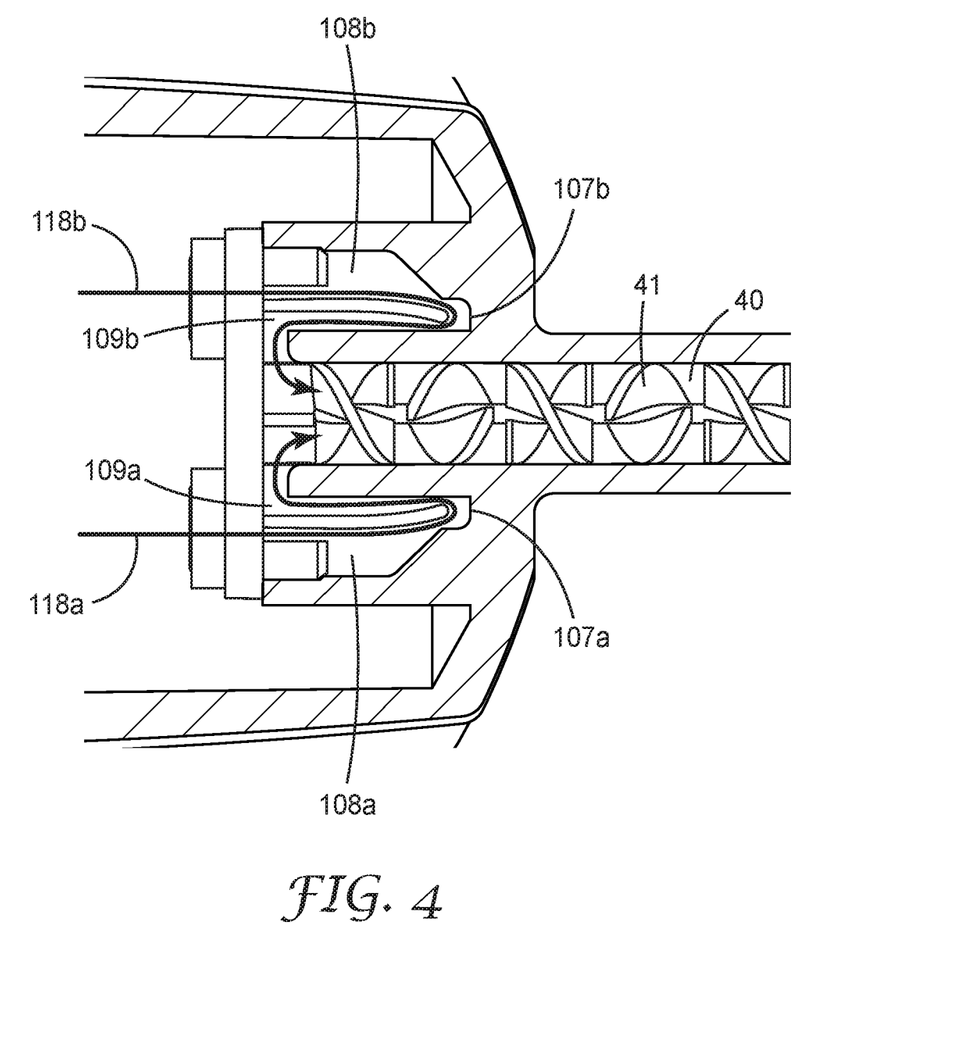
FIG. 4 is a cross-sectional view of the mixing assembly shown in FIG. 3 at a second stage of operation.

FIG. 4 shows the mixer assembly 100 with the first and second flap 115a, 115b in a second position in which the first and second flap 115a, 115b are bent away from the respective lateral sealing surface 114a, 114b. The first and second flap 115a, 115b are urged in the second position against a natural reset force provided by the material and structure of the first and second flap 115a, 115b. This means that preferably, the first and second flap 115a, 115b are provided in a shape that corresponds to shape associated with the first position, and that a force is required to deflect the first and second flap 115a, 115b toward a shape which corresponds to the shape associated with the second position. Further, thus the first and second flap 115a, 115b also typically reset toward the first position by natural reset force provided by the material and structure of the first and second flap 115a, 115b. The force for deflecting or bending the first and second flap 115a, 115b is typically provided by the components being urged and flowing in a direction from the first and second inlet-side duct 108a, 108b to the first and second mixer-side duct 109a, 109b, respectively. Such a flow of the components is indicated by a first and a second arrow 118a, 118b. In case the flow would be reversed the reverse flow accordingly would cause the first and second flap 115a, 115b to reset from the second position to the first position so that the first and second passageway 107a, 107b are blocked and thus the reverse flow is prohibited as soon as the first position has established. Accordingly, any cross-contamination between the components in an area of the first and second inlet 110a, 110b can be prevented. It has been found that a reverse flow of the components may occur, for example, in consequence of disconnecting the mixing assembly 100 from the cartridge 20, for example due to a vacuum being caused during disconnecting the first and second inlet 110a, 110b from respective outlets provided at the cartridge 20. Further, cross-contamination may be caused by asynchronous urging the two components toward the mixing assembly 100, or in consequence of temperature variation or a difference in viscosity between the two components. With the present invention such cross-contamination can be avoided. Thus, if used for the preparation of a hardenable material, for example a dental material, the individual components stored in the cartridge can be effectively protected from cross-contamination. Therefore, the shelf-life of the components in the cartridge can be maximized.

Figure 5:
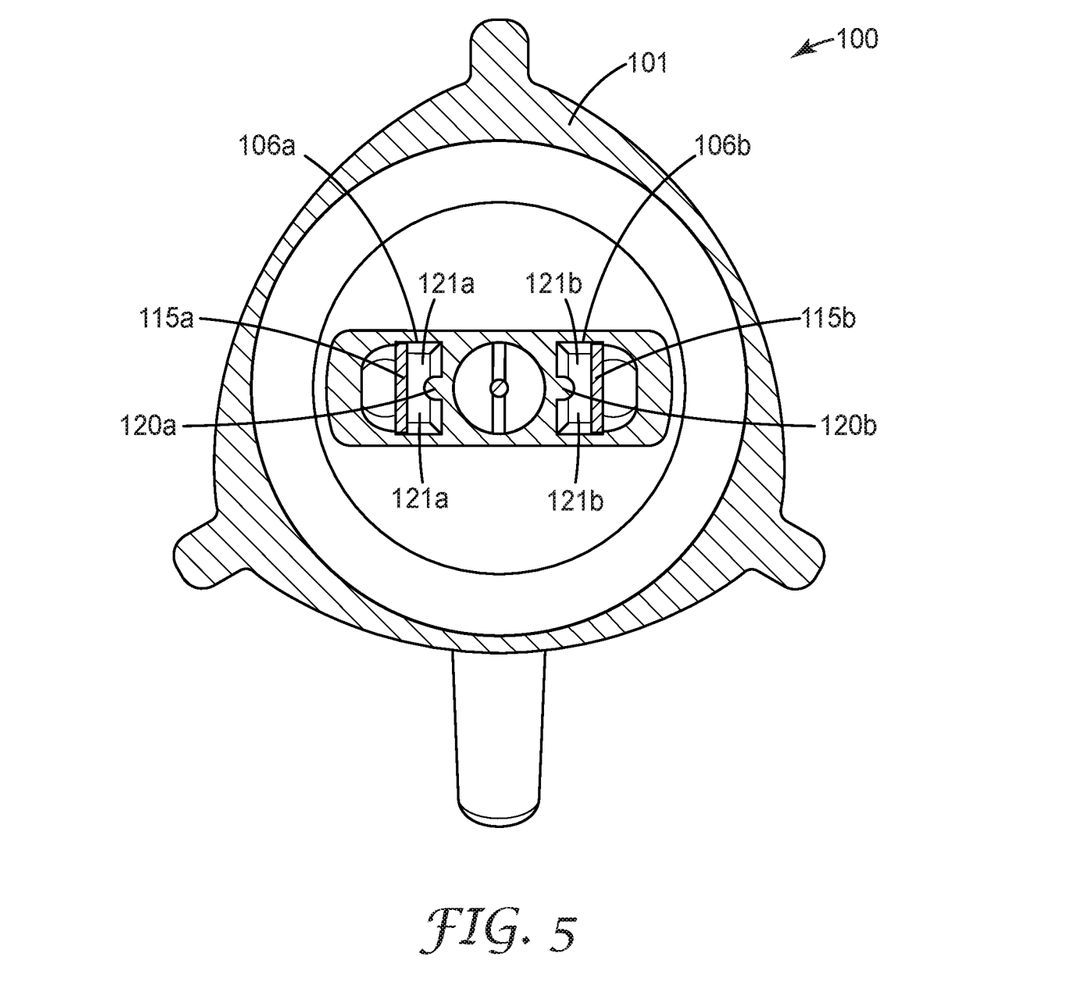
FIG. 5 is a cross-sectional view of the mixing assembly shown in FIG. 3.

FIG. 5 shows a cross-section of the mixer assembly 100, in the first position of the first and second flaps 115a, 115b. The housing 101 has a first and a second spacer 120a, 120b arranged within the first and second blind-hole 106a, 106b, in particular within the first and second mixer-side duct 109a, 109b, respectively. The first and a second spacer 120a, 120b limit a travel of the first and second flap 115a, 115b in the second position of the first and second flap 115a, 115b to prevent the first and second flap 115a, 115b to close the first and second mixer-side duct 109a, 109b in the second position. As illustrated, the first and second spacer 120a, 120b maintain flow channels (indicated as 121a, 121b) for the components in the second position of the first and second flap 115a, 115b.

The invention claimed is:

1. A device for dispensing a dental material, comprising a cartridge having a first chamber for holding a first component and a second chamber for holding a second component; and
a mixer assembly comprising
a housing that forms a mixing channel,
a static mixing element being arranged within the mixing channel,
wherein the mixer assembly further comprises an inlet end comprising a first inlet in fluid communication with the first chamber and a first non-return valve and a second inlet in fluid communication with the second chamber and a second non-return valve and a dispensing end for dispensing a mixture of the components,
wherein each of the first and second inlets is fluidly connectable with the mixing channel via the associated non-return valve; and wherein the mixer assembly further comprises for each component a passageway that at a first end forms the respective inlet and at a second end forms an orifice into the mixing channel, wherein the non-return valve is arranged between the inlet and the orifice;
wherein the passageway has an inlet-side duct between the inlet and the non-return valve and a mixer-side duct between the non-return valve and the orifice;
wherein the non-return valve comprises a resilient flap; and
wherein the housing adjacent the inlet end comprises two blind-holes, wherein in each blind-hole one of the resilient flaps extends.

2. The device of claim 1, wherein each non-return valve permits a flow of the components in a direction from the inlets toward the dispensing end but blocks a flow in the opposite direction.

3. The device of claim 1, wherein the resilient flap forms a wall portion of the inlet-side duct and the mixer-side duct.

4. The device of claim 1, wherein the mixing element is formed in one monolithic piece and comprises a plurality of mixing paddles and two flaps.

5. The device of claim 1, wherein the passageway is formed in that the resilient flap divides the space defined by the blind-hole.

6. The device of claim 1, wherein at least one of the blind-holes extends along an insertion axis and has a stepped inward end face, wherein the stepped end face has a first partial end face and a second partial end face and a lateral sealing face between the first and second partial end face, wherein the lateral sealing face is generally parallel to the insertion axis, and wherein the resilient flap abuts the lateral sealing face of the step.

7. The device of claim 6, wherein the resilient flap is movable in a direction away from the lateral sealing surface, wherein in a first position, in which the resilient flap abuts the lateral sealing surface, the inlet-side duct and the mixer-side duct are disconnected from fluid communication with each other, and in a second position, in which the resilient flap bends away from the lateral sealing surface, the inlet-side duct and the mixer-side duct are connected for fluid communication with each other.

8. The device of claim 1, wherein the housing at the inlet end forms an annular skirt surrounding the inlets, and wherein the inlets are offset from an end of the skirt in a direction inward a space that is defined by the skirt.

* * * * *